United States Patent
Fukasaku et al.

(10) Patent No.: US 12,492,962 B2
(45) Date of Patent: Dec. 9, 2025

(54) DISCONNECTION DETECTION METHOD AND DISCONNECTION DETECTION DEVICE

(71) Applicant: Proterial, Ltd., Tokyo (JP)

(72) Inventors: Izumi Fukasaku, Tokyo (JP); Ayano Kato, Tokyo (JP)

(73) Assignee: Proterial, Ltd., Tokyo (JP)

( * ) Notice: Subject to any disclaimer, the term of this patent is extended or adjusted under 35 U.S.C. 154(b) by 300 days.

(21) Appl. No.: 18/126,135

(22) Filed: Mar. 24, 2023

(65) Prior Publication Data

US 2024/0019338 A1   Jan. 18, 2024

(30) Foreign Application Priority Data

Jul. 15, 2022   (JP) ................................ 2022-113706

(51) Int. Cl.
  *G01M 5/00*   (2006.01)
  *G01R 31/54*  (2020.01)
  *G01R 31/58*  (2020.01)

(52) U.S. Cl.
  CPC ........ *G01M 5/0066* (2013.01); *G01M 5/0025* (2013.01)

(58) Field of Classification Search
  CPC ...... G01N 27/72; G01N 29/46; G01N 27/904; G01N 27/041; G01N 3/066; G01N 27/9006; G01N 27/82; G01N 27/83; G01B 7/00; G01B 7/18; G01M 5/0025; G01M 99/00; G01R 31/58; G01R 31/083; G01R 31/52; G01L 5/10; G01D 5/2086

USPC .................................................... 73/572, 12.9
See application file for complete search history.

(56) References Cited

U.S. PATENT DOCUMENTS

2023/0090896 A1   3/2023   Nonen et al.

FOREIGN PATENT DOCUMENTS

| DE | 102021107912 A1 | * | 9/2021 | ............ G01M 99/00 |
|----|---|---|---|---|
| JP | 2000-28674 A | | 1/2000 | |
| JP | 2007-139488 A | | 6/2007 | |
| JP | 2021078213 A | * | 5/2021 | |
| JP | 7054462 B1 | | 4/2022 | |

(Continued)

OTHER PUBLICATIONS

Japanese Office Action, dated Sep. 12, 2023 in Japanese Application No. 2022-113706 and English Translation thereof.

(Continued)

*Primary Examiner* — Brandi N Hopkins
(74) *Attorney, Agent, or Firm* — McGinn I.P.Law Group, PLLC

(57) ABSTRACT

A method for detecting a disconnection of a conductor of a cable includes performing an excitation to apply a periodic vibration at an arbitrary examined portion in a longitudinal direction of the cable, measuring a time-series resistance value of the conductor by the excitation, performing a frequency analysis for the measured time-series resistance value of the conductor, extracting a resistance value variation component at an exciting frequency corresponding to an operation period of the excitation from a result of the frequency analysis, and detecting the disconnection in the conductor at the examined portion based on a magnitude of the extracted resistance value variation component.

4 Claims, 7 Drawing Sheets

(56) References Cited

FOREIGN PATENT DOCUMENTS

JP            2022140768  A   *   9/2022   ............ G01M 99/00

OTHER PUBLICATIONS

Japanese Office Action, issued on Jan. 23, 2024 in Japanese Application No. 2022-113706 and English Translation thereof.
Japanese Office Action for Japanese Patent Application No. 2024-068350 dated Jan. 21, 2025 with English translation.

* cited by examiner

3 RESISTANCE MEASURING DEVICE

DISCONNECTION DETECTION METHOD AND DISCONNECTION DETECTION DEVICE

CROSS-REFERENCE TO RELATED APPLICATIONS

The present patent application claims the priority of Japanese patent application No. 2022-113706 filed on Jul. 15, 2022, and the entire contents thereof are hereby incorporated by reference.

TECHNICAL FIELD

The present invention relates to a disconnection detection method and a disconnection detection device for detecting a disconnection of a conductor.

BACKGROUND OF THE INVENTION

Patent Literature 1 discloses a method for detecting a sign of a disconnection (i.e., wire breakage) of a conductor due to bending, for a wire cable having a conductor composed of a stranded conductor obtained by twisting a plurality of wires (i.e., strands, elementary wires). Specifically, in this method, a wire cable is periodically bent and stretched in one direction while an electric current is flowing, and current components that change in synchronization with this bending cycle (i.e., flexion cycle) are detected. That is, in this method, a state is detected in which contact and separation are repeated in synchronization with the bending cycle at some disconnection points.

CITATION LIST

Patent Literature 1: JP 2007-139488 A

SUMMARY OF THE INVENTION

The occurrence of a disconnection in the conductor of a cable is generally detected by measuring the electrical resistance of the conductor inside the cable. When the disconnection occurs in some of the wires included in the conductor, the resistance value of the conductor increases. For example, by measuring in advance the resistance value of the conductor in the initial state where no disconnection has occurred, the occurrence of disconnection can be detected based on the rate of increase in the resistance value from the initial state.

However, when the disconnection occurs in a very small portion of the wires included in the conductor, that is, when the number of disconnections in the conductor is small, i.e., the disconnection at an early stage (=initial disconnection), the rate of increase in the resistance value of the conductor is so small that it is difficult to distinguish it from noise (e.g., resistance value fluctuation due to the environmental temperature change or external electrical noise). For this reason, practically, unless the ratio of the number of broken wires to the total number of wires constituting the conductor reaches a predetermined ratio (for example, at least a level of 50% or more), it can be difficult to determine whether the disconnection has occurred based on the rate of increase in the resistance value of the conductor. As a result, it is not easy to detect the occurrence of disconnection based on the rate of increase in the resistance value of the conductor at the early stage, i.e., from the initial state with no disconnection until the point immediately after the occurrence of initial disconnection. In a device such as an industrial robot, the disconnection occurring in a conductor of a cable wired to the device may cause a malfunction of the device. From the viewpoint of alleviating such concerns, it is desirable to be able to detect the occurrence of disconnection even at the early stage (i.e., to be able to detect the occurrence of disconnection with high sensitivity).

Therefore, it is an object of the present invention to provide a disconnection detection method and a disconnection detection device, which can detect with high sensitivity that a disconnection has occurred in a conductor.

For solving the above problem, one aspect of the invention provides a method for detecting a disconnection of a conductor of a cable comprising: performing an excitation to apply a periodic vibration at an arbitrary examined portion in a longitudinal direction of the cable; measuring a time-series resistance value of the conductor by the excitation; performing a frequency analysis of the measured time-series resistance value of the conductor; extracting a resistance value variation component at an exciting frequency corresponding to an operation period of the excitation from a result of the frequency analysis; and detecting the disconnection in the conductor at the examined portion based on a magnitude of the extracted resistance value variation component.

Further, for solving the above problem, another aspect of the invention provides a disconnection detection device for detecting a disconnection in a conductor of a cable, comprising: an exciting mechanism to perform an excitation to apply a periodic vibration at an arbitrary examined portion in a longitudinal direction of the cable; a resistance measuring device to measure a time-series resistance value of the conductor by the excitation; a frequency analysis section to perform a frequency analysis for the measured time-series resistance value of the conductor; an extracting section to extract a resistance value variation component at an exciting frequency corresponding to an operation period of the excitation from a result of the frequency analysis; and a disconnection detection section to detect the disconnection in the conductor at the examined portion based on a magnitude of the extracted resistance value variation component.

According to the present invention, it is possible to provide a disconnection detection method and a disconnection detection device, which can detect with high sensitivity that the disconnection has occurred in a conductor.

DETAILED DESCRIPTION OF THE INVENTION

Embodiments

Hereinafter, the embodiments of the present invention will be explained in accordance with appended drawings.

Figure 1:
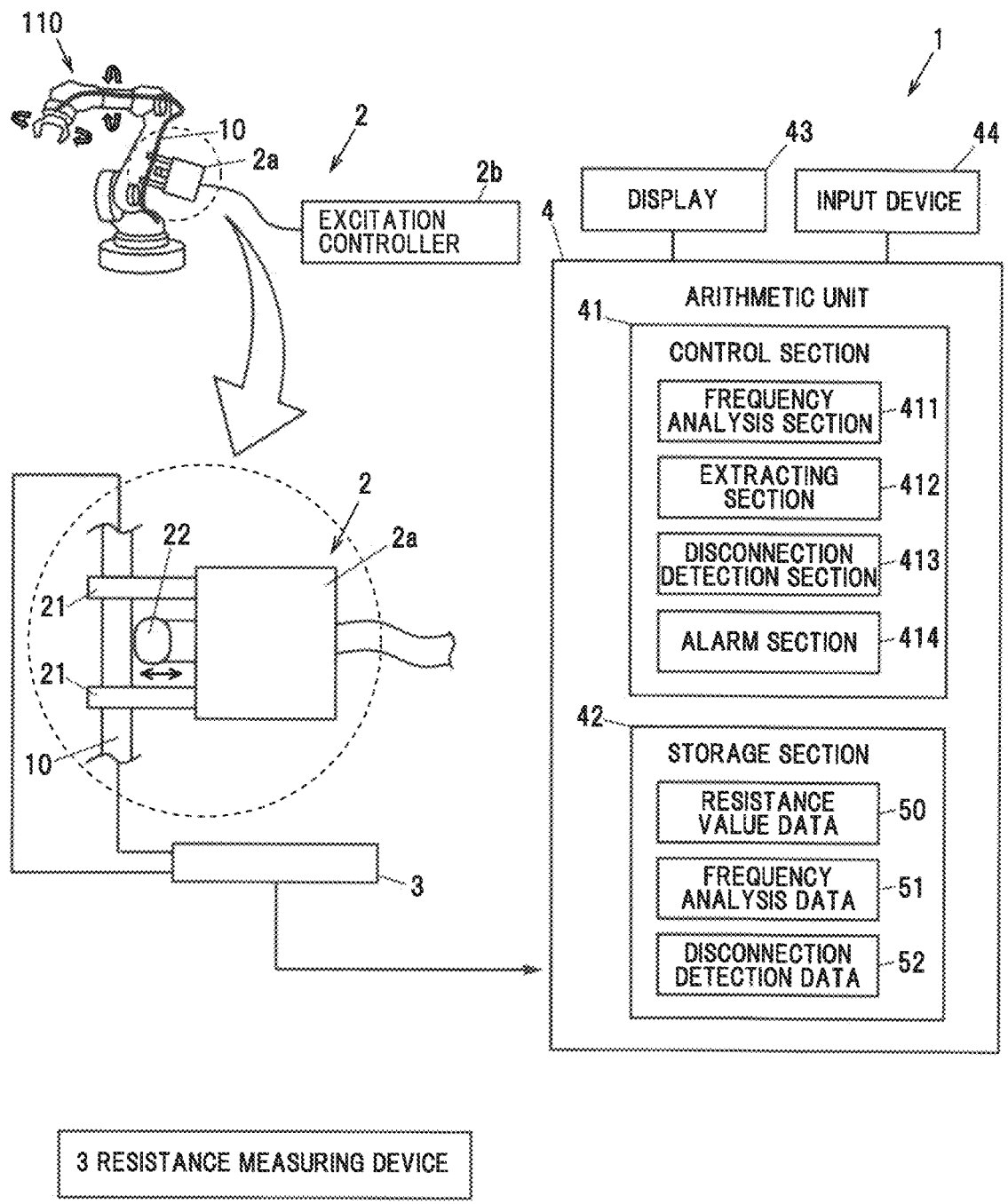
FIG. 1 is a schematic configuration diagram showing a disconnection detection device according to one embodiment of the present invention.
Figure 2:
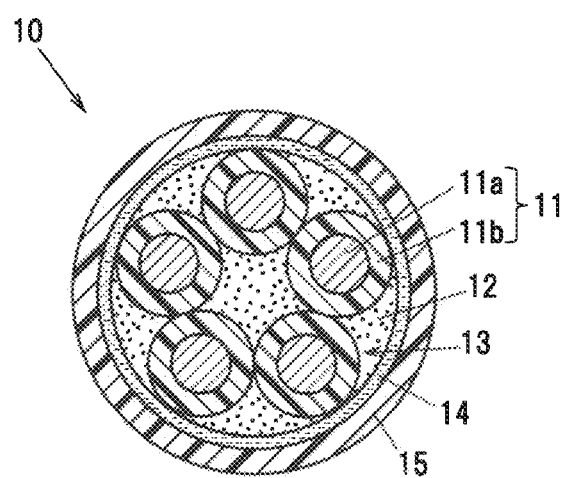
FIG. 2 is a cross-sectional view showing a schematic configuration example of a cable as a disconnection detection target.

FIG. 1 is a schematic configuration diagram showing a disconnection detection device 1 according to the present embodiment. FIG. 2 is a cross-sectional view showing a schematic configuration example of a cable 10 which is a disconnection detection target.

The cable 10 shown in FIG. 2 includes a cable core 13 which is formed by twisting five electric wires 11 and a fibrous filler 12, a binder tape (i.e., press-winding tape) 14 which is spirally wound around the cable core 13, and a sheath 15 provided to cover around the binder tape 14. Each of the electric wires 11 includes a conductor 11a composed of a twisted wire conductor which is formed by twisting a plurality of wires, and an insulator 11b provided to cover around the conductor 11a. For example, the conductor 11a is configured by collectively twisting nineteen wires each composed of a soft copper wire having an outer diameter of 0.08 mm. For example, the insulator 11b is composed of a fluororesin such as tetrafluoroethylene-ethylene copolymer (ETFE). For example, the filler 12 is composed of jute or spun rayon. In the meantime, the number of electric wires 11 used for the cable 10 is not limited to five. For example, the binder tape 14 is composed of a tape member made of non-woven fabric, paper, resin and so on. For example, the sheath 15 is composed of polyethylene (PE), polypropylene (PP), or polyvinylchloride (PVC). In the meantime, a configuration of the cable 10 is not limited to the shown configuration. The configuration may be variable as long as comprising at least the conductor 11a composed of a twisted conductor. That is, the number of electric wires 11 may be one, a few, or more than dozens. In the meantime, when the number of electric wires 11 is one, the filler 12, the binder tape 14, and the sheath 15 are often omitted. In this case, the cable 10 and the electric wire 11 mean the same object.

The cable 10 as a disconnection detection target, i.e., an object for which disconnection is detected, can be already wired, or laid in a device and the like. For example, the cable 10 as the disconnection detection target may be a cable arranged in an industrial robot, or a cable arranged in a vehicle.

As shown in FIG. 1, the disconnection detection device 1 is a device for detecting disconnection of the conductor 11a of the cable 10 comprising the conductor 11a composed of a twisted conductor formed by twisting the plurality of wires. The disconnection detection device 1 comprises an exciting mechanism 2, a resistance measuring device 3, and an arithmetic unit 4.

The exciting mechanism 2 is a mechanism to perform an excitation (i.e., exciting action) for applying a periodic vibration at an arbitrary examined portion in a longitudinal direction of the cable 10. The exciting mechanism 2 is configured to locally apply vibration at an arbitrary position in the longitudinal direction of the cable 10 as the examined portion. In the present embodiment, the case where the cable 10 as a disconnection detection target is mounted on an industrial robot 110 will be explained.

The exciting mechanism 2 comprises a probe 2a for exciting the examined portion in the cable 10 and an excitation controller 2b for controlling the excitation of the probe 2a. For example, an examination for detecting the disconnection of the conductor 11a may be performed with a periodic examination for the industrial robot 110.

The probe 2a of the exciting mechanism 2 comprises a vibration head 22 that vibrates. The probe 2a is configured to apply a constant periodic vibration to the examined portion by pushing the vibration head 22 onto the arbitrary examined portion of the cable 10.

In addition, the exciting mechanism 2 is preferably configured to apply the vibration to cause a displacement of the cable 10 in a direction orthogonal to a cable longitudinal direction with applying a constant tension to the cable 10. More specifically, the probe 2a comprises a pair of holding parts 21 to hold the cable 10 at two points sandwiching the examined portion in the cable 10, and is configured to attach the vibration head 22 to the examined portion in the cable 10 located between one pair of the holding parts 21 with applying constant tension to the cable 10 by the pair of the holding parts 21. The vibration head 22 is preferably provided to vibrate along the direction orthogonal to the cable longitudinal direction (to reciprocate move). In the meantime, "the constant tension" herein means a tension enough to vary the tension of the cable (specifically, the conductor 11a of the cable 10) between the pair of holding parts 21 due to e.g., the movement of the vibration head. In addition, the holding parts 21 should hold the cable 10 to suppress an allowance (i.e., eliminate a play of the cable 10) to the extent that the tension does not vary due to the movement of the vibration head 22. In addition, the holding parts 21 preferably hold the sheath of the cable 10 with a pressure, which can press the sheath of the cable and suppress the movement of the cable core inside the cable 10. Thus, it is possible to suppress the decrease in tension variation due to the cable core movement due to excitation, suppress the decrease in sensitivity due to the decrease in resistance value variation due to vibration, and suppress the deterioration in locality due to increasing the resistance value variation due to disconnection outside the holding parts 21. In addition, if the vibration applied to the cable 10 functions in the direction along the longitudinal direction of the cable 10, it may cause the noise. Thus, the vibration applied to the cable 10 preferably does not have a component along the longitudinal direction of the cable 10. Furthermore, the exciting mechanism 2 may comprise a support member for supporting the cable 10 to vibrate by the movement of the vibration head 22. For example, the supporting member is provided at a position facing the vibration head 22 to contact a surface of the cable 10. The support member displaces the cable 10 toward a vibration head 22-side when the vibration head 22 is separated from the cable 10 (i.e., the cable 10 returns to a position when vibration is not applied to the cable 10). Hereby, it is possible to apply the vibration that can cause the displacement of the cable 10.

In the present embodiment, a portable (i.e., carriable) exciting mechanism 2 comprising the probe 2a is used. Thus, it is possible to detect the disconnection in the conductor 11a included in the cable 10 without removing the cable 10 that is already wired or laid. However, the present invention is not limited thereto, and a fixed-type exciting mechanism 2 can be used. In such a case, when examining the cable 10 already wired or laid, the examination is performed by removing the cable 10 from a wired position or a laid position and setting the cable 10 to the exciting mechanism 2. In addition, if a localization for specifying a disconnected position is not required, the holding part 21 is not an essential element. The holding part 21 can be omitted, for example, when the cable 10 is already wired with a constant tension.

The resistance measuring device 3 is configured to measure a time-series (i.e., chronological) resistance value of the conductor 11a, which changes over time, by the excitation. In the present embodiment, the resistance measuring device 3 measures the resistance value of the conductor 11a in time series during the excitation. Data of the time-series resistance value of the conductor 11a measured by the resistance measuring device 3 is input into an arithmetic unit 4, and is stored in a storage section 42 as a resistance value data 50. In the present embodiment, the resistance measuring device 3 is independently composed (i.e., as a separate body) of the arithmetic unit 4, the present invention is not limited thereto. The resistance measuring device 3 may be integrally formed (i.e., as one body) with the arithmetic unit 4. In addition, the functions of the resistance measuring device 3 may be partially mounted in the arithmetic unit 4. Furthermore, the resistance measuring device 3 may be mounted on a controller (not shown) of the industrial robot 110. The resistance measuring device 3 preferably measures the resistance value at a sampling rate that is fast enough with respect to an operation period in the excitation. The detail of the resistance measuring device 3 will be explained below.

The arithmetic unit 4 comprises a control section 41, and a storage section 42. The details of the control section 41 and the storage section 42 will be explained below. A display 43 is connected to the arithmetic unit 4. The arithmetic unit 4 is configured to display each data such as the resistance value data 50 and the result of disconnection detection to the display 43. An input device 44 such as a keyboard, mouse, or the like is provided in the arithmetic unit 4. It is possible to set respective items or control displaying contents in the display 43 by input from the input device 44. In addition, the display 43 may be composed of a touch panel display to be combined with the input device 44. Furthermore, the display 43 and the input device 44 may be connected to the arithmetic unit 4 with or without wired communication, i.e., by wireless communication. In such a case, for example, the display 43 and the input device 44 may be mobile devices such as smartphone and tablet.

Principal of Disconnection Detection

Figure 3:
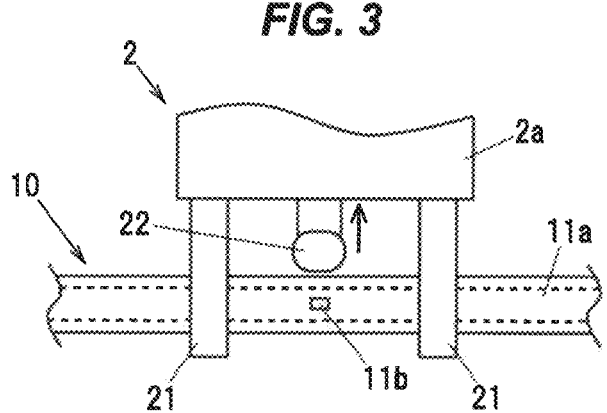
FIG. 3 is a diagram for explaining a principle to detect the disconnection.
Figure 3:
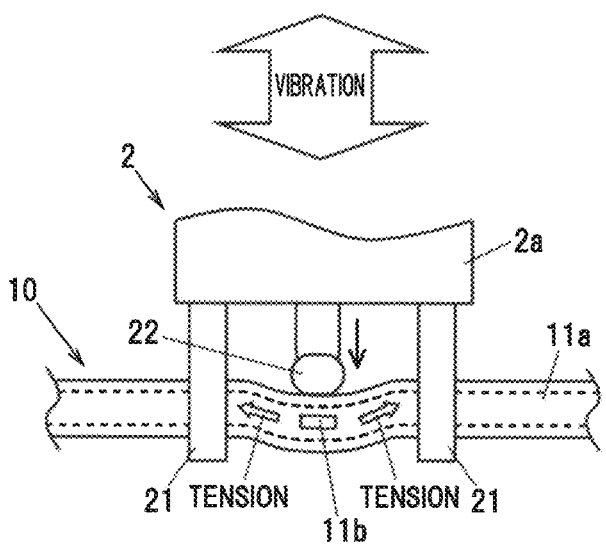

When the vibration head 22 of the exciting mechanism 2 contacts a desired examined portion in the cable 10 and vibrates, the examined portion in the cable 10 is excited in accordance with the vibration from the vibration head 22. Hereby, as shown in FIG. 3, the examined portion in the cable 10 periodically displaces in accordance with periodic displacements of the vibration head 22, and the reciprocate movement orthogonal to the longitudinal direction of the cable 10 occurs at the examined portion in the cable 10. In such a case, when the disconnection occurs at the wires in the conductor 11a, the length of the disconnected part 11c (a distance between wire ends facing each other with respect to the disconnected part 11c) periodically varies and thus the resistance value of the conductor 11a periodically varies (with the same period as the vibration period).

This variation (i.e., fluctuation) in resistance value is so small to be buried under the noise. Therefore, it will be difficult to detect this variation if simply measuring the resistance value. However, the variation in resistance value due to the disconnected part 11c becomes a resistance value variation signal, which is modulated by an exciting frequency corresponding to the operation period of the excitation. Thus, it is possible to suppress the noise and extract only the resistance value variation due to the disconnected part 11c with high sensitivity, by extracting a resistance value variation component of the exciting frequency from a measurement result of the resistance value of the conductor 11a in continuous time. It is possible to further control the influence of the noise by reducing bandwidth over a long-time measurement of the resistance value variation by the resistance measuring device 3. Then, it is possible to detect the wire disconnection with high sensitivity by detecting the wire disconnection based on the magnitude of the extracted resistance value variation component. It should be noted that FIG. 3 shows the case where the cable 10 includes only one conductor 11a for the purpose of simplifying the illustration.

Further, in the present embodiment, since the cable 120 is held by the pair of the holding parts 21, the tension applied to the conductor 11a periodically varies (in the same frequency as the frequency of vibration) in accordance with the periodic displacement of the position of the examined portion of the cable 10. Hereby, the resistance value variation of the conductor 11a further increases, thereby improving the detection accuracy for wire disconnection.

Furthermore, in the present embodiment, an arbitrary position in the longitudinal direction of the cable 10 is determined as the examined portion and the excitation is carried out on the examined portion. When the conductor 11a is disconnected but the broken parts of the conductor 11a are electrically connected with each other, the resistance value does not vary so it may be deemed as a non-disconnected state. Even in such a case, it is possible to detect the occurrence of disconnection with high sensitivity. Therefore, in the present embodiment, plural parts in the longitudinal direction of the cable 10 are defined as the examined portions and the examination described above are carried out on each examined portion. Thereby, it is possible to specify the position of the disconnection in the longitudinal direction of the cable 10. Further, in the present embodiment, it is possible to estimate a disconnection progress in the longitudinal direction of the cable 10, based on the magnitude of the resistance value variation component extracted at the plural examined portions in the longitudinal direction of the cable 10.

If the exciting frequency is too low, the influence of the noise will increase. Therefore, it is preferable to set the exciting frequency of at least not less than 0.5 Hz, more preferably not less than 1.0 Hz. If the exciting frequency is too high, the cable 10 does not follow the vibration. Therefore, it is preferable to set the exciting frequency to the frequency at which the cable 10 can follow the vibration. In addition, it is preferable to set the exciting frequency in a frequency band other than a power frequency, to avoid the influence of the power noise. Furthermore, the rigidity of the cable 10 increases as an outer diameter of the cable 10 increases so the displacement due to the excitation hardly occurs. Therefore, it is preferable to increase an interval between the pair of the holding parts 21 in accordance with the increase in the outer diameter of the cable 10. In other words, it is preferable to set the interval between the pair of the holding parts 21 corresponding to the outer diameter of the cable 10 (rigidness of the cable 10).

Detail of the Resistance Measuring Device 3

Figure 4A:
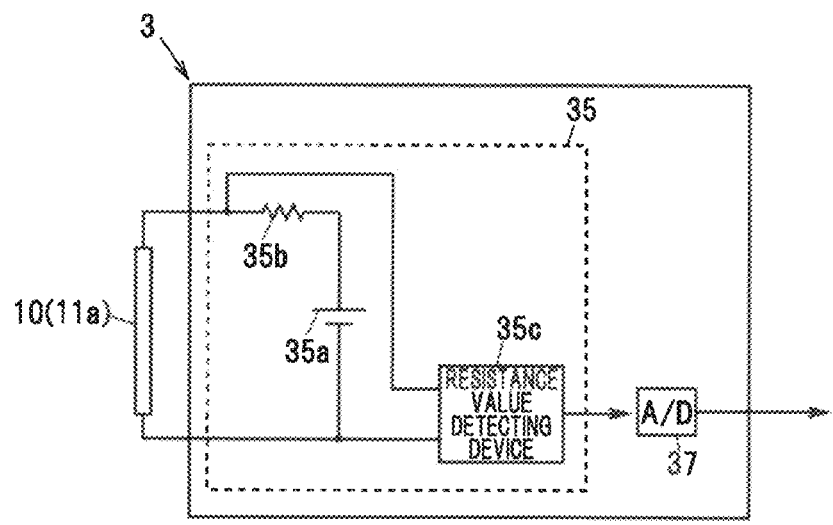
FIGS. 4A and 4B are diagrams showing schematic configuration examples of a resistance measuring device.

FIG. 4A is a diagram showing a schematic configuration example of the resistance measuring device 3. As shown in FIG. 4A, the resistance measuring device 3 comprises a resistance measuring part 35 comprising a Direct Current signal source 35a (e.g., DC constant voltage source), an input resistor 35b, and a resistance value detecting device 35c. When a DC constant current source is used as the DC signal source 35a, the input resistor 35b can be omitted. The DC signal source 35a applies a DC signal (herein, DC voltage) to the cable 10 (the conductor 11a) through the input resistor 35b. In response to this input, a modulation signal (e.g., a voltage signal) including a component of the exciting frequency f by the excitation is output from the cable 10 (the conductor 11a). For example, the resistance value detecting device 35c detects the time-series resistance value variation in the conductor 11a by amplifying the modulation signal at a predetermined gain. The signal from the resistance value detecting device 35c is converted into a digital signal by the A/D converter 37 and output to the arithmetic unit 4 as a resistance value data 50.

Figure 4B:
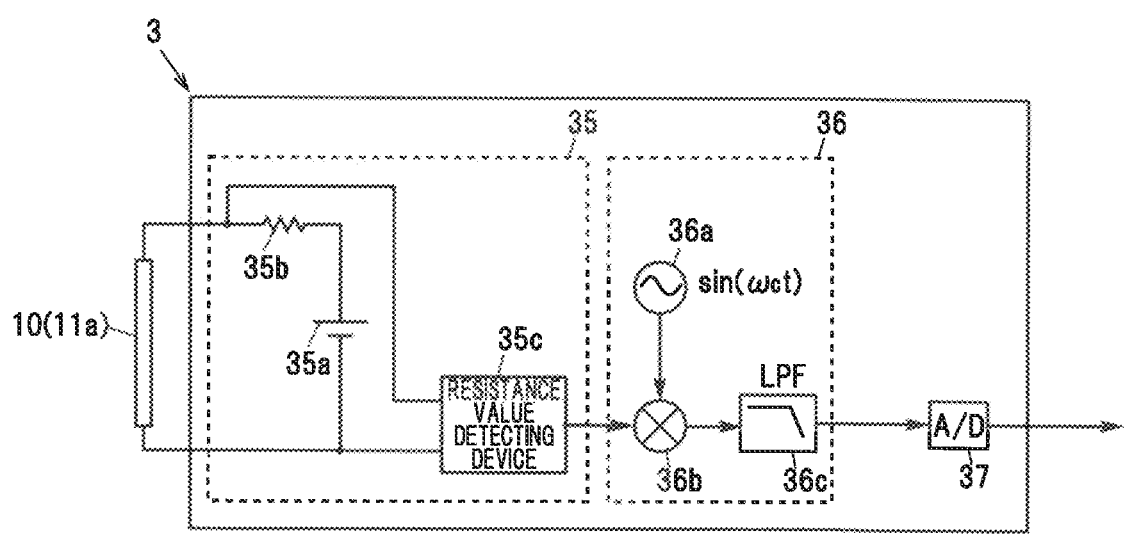

In the meantime, the configuration of the resistance measuring device 3 shown in FIG. 4A is merely an example and can be suitably modified. For example, as shown in FIG. 4B, the resistance measuring device 3 may integrally comprise a frequency analysis section 36. In such a case, a frequency analysis section 411 in the arithmetic unit 4 described below (see e.g., FIG. 1) can be omitted.

For example, the frequency analysis section 36 comprises a carrier signal generator 36a, a mixer 36b, and a low-pass filter (LPF) 36c. The carrier signal generator 36a generates a carrier signal having the same carrier frequency ($\omega c$) as the exciting frequency f, i.e., a resistance value variation frequency due to disconnection and the same phase as the resistance value variation frequency. The mixer 36b multiplies the carrier signal and the output signal from the resistance value detecting device 35c (in other words, synchronous detection) to output a superposed signal of a DC component signal and a "$2\omega c$" component signal. The carrier signal generator 36a as shown in FIG. 4B can extract the resistance value variation component at the exciting frequency f where $\sin(\omega ct)$ is $\omega c = 2\pi f$.

When the low-pass filter 36c receives the output signal from the mixer 36b, the low-pass filter 36c cuts the "$2\omega c$" component signal and pass the DC component signal. The DC component signal indicates the magnitude of the resistance value variation component at the exciting frequency $f(=\omega c)$. As described above, it is possible to detect the component of the predetermined frequency (e.g., the component of a predetermined high-order frequency described below) by using the carrier signal generator 36a, the mixer 36b, and the low-pass filter 36c. A signal from the low-pass filter 36c is translated into a digital signal by the A/D converter 37 and is output to the arithmetic unit 4.

Here, in the configuration examples as shown in FIGS. 4A, 4B, the DC signal is applied to the cable 10 (the conductor 11a). However, the signal to be applied is not limited to the DC signal, and an AC signal having a predetermined frequency (e.g., about 10 kHz) may be applied using an AC signal source. In such a case, a signal like this AC signal being amplitude modulated by the modulation signal having the exciting frequency f is output from the cable 10. Then, this output signal is multiplied with a carrier signal having the same frequency as the AC signal output from the AC signal source by using a mixer, to demodulate the modulation signal having the exciting frequency f. By using such a method, the measurement at a higher frequency (e.g., about 10 kHz) can be achieved so that the influence of the noise component is further reduced.

Arithmetic Unit 4

In a control section 41 of the arithmetic unit 4, a frequency analysis section 411, an extracting section 412, a disconnection detection section 413, and an alarm section 414 are installed. The frequency analysis section 411, the extracting section 412, the disconnection detection section 413, and the alarm section 414 are provided by suitably combining logic elements such as Central Processing Unit (CPU), memories such as Random Access Memory (RAM), and Read Only Memory (ROM), software, interface, and storage device.

The frequency analysis section 411 performs frequency analysis of the resistance value data 50 (i.e., time-series variable data of the resistance value of the conductor 11a) measured by the resistance measuring device 3. The result of the frequency analysis is stored in the storage section 42 as a frequency analysis data 51. Here, the "frequency analysis" means a process of analyzing the magnitude of each frequency component included in the resistance value data 50 and obtaining the frequency analysis data 51 by extracting the magnitude of the component for each frequency.

Figure 5:
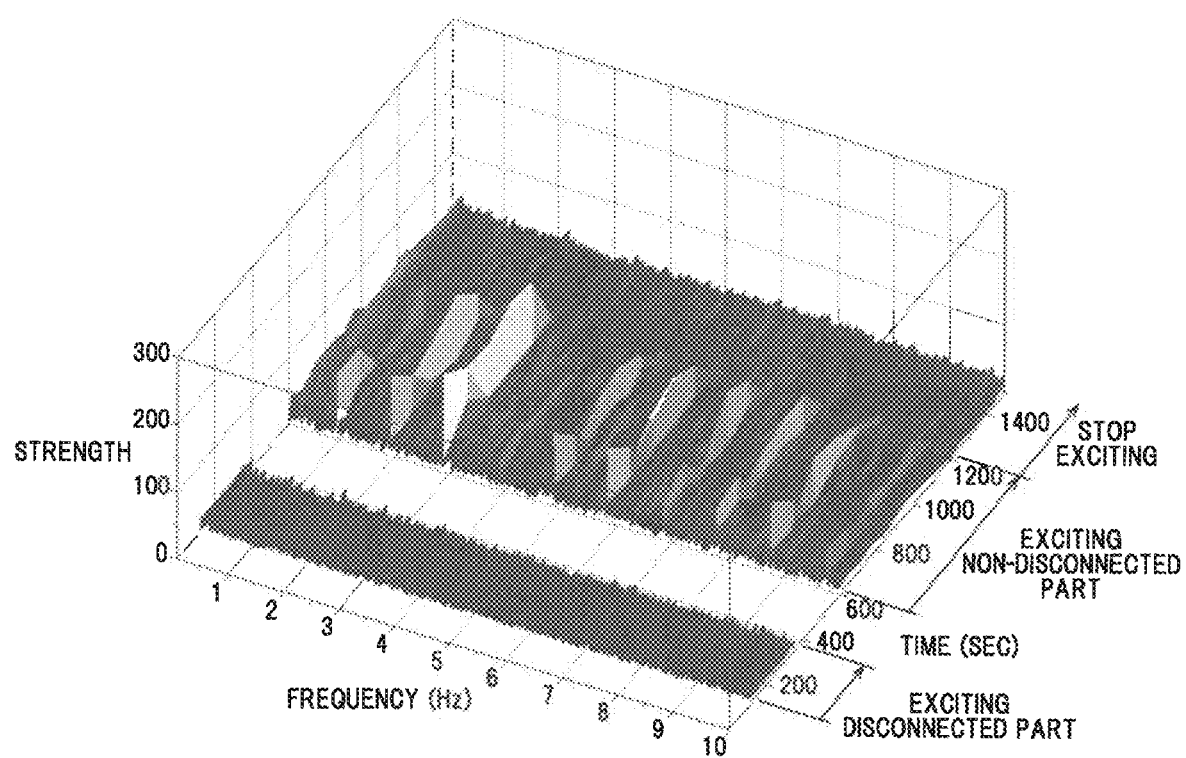
FIG. 5 is a diagram showing an example of frequency analysis data obtained by a frequency analysis section.

FIG. 5 is a diagram showing an example of the frequency analysis data 51 obtained by the frequency analysis section 411, in the case where a non-disconnected part and a disconnected part in the longitudinal direction of the cable 10 having the outer diameter of about 6 mm are defined as the examined portions and these examined portions are excited at about 60 rpm (about 1 Hz). As shown in an area indicated as "exciting non-disconnected part" in FIG. 5, when the non-disconnected part of the cable 10 is excited, the strength hardly increases (i.e., the strength hardly changes) at the exciting frequency of about 1 Hz and at higher order frequencies of n-times (n is a natural number not less than two) about 1 Hz. In the meantime, as shown in an area indicated as "exciting disconnected part" in FIG. 5, when the disconnected part of the cable 10 is excited, the strength increases respectively at the exciting frequency of about 1 Hz and at higher order frequencies of n-times (n is a natural number not less than two) about 1 Hz. Further, as shown in an area indicated as "stop exciting" in FIG. 5, when the excitation is stopped, the strength at these frequencies almost disappears.

The extracting section 412 extracts, based on the frequency analysis data 51 as the frequency analysis result, the resistance value variation component (=strength) at the exciting frequency f corresponding to the operation period in the excitation. In addition, the extracting section 412 may extract the resistance value variation component (=strength) at the high-order frequency f×n (n=natural number not less than 2) as referencing the exciting frequency f. This extracted high-order frequency is preferably suitably set at the frequency causing the resistance value variation in the conductor 11a by the excitation.

The disconnection detection section 413 detects the disconnection in the conductor (i.e., the disconnection of one or more wires constituting the conductor) based on the magnitude of the resistance value variation component at the exciting frequency f extracted by the extracting section 412. More specifically, the disconnection detection section 413 compares the magnitude of the resistance value variation component at the exciting frequency f (in the example as shown in FIG. 5, the magnitude of the resistance value variation component at the frequency of about 1 Hz) extracted by the extracting section 412 with a predetermined threshold, and determines the occurrence of disconnection when the magnitude of the resistance value variation component at the exciting frequency f is not less than the threshold. Further, a degree of the wire disconnection (such as the number of disconnected wires) may be gradually detected by setting plural thresholds and comparing the magnitude of the resistance value variation component at the exciting frequency f with each of the thresholds.

In addition, the disconnection detection section 413 may be configured to detect the wire disconnection by comparing the resistance value variation component at the high-order frequency f×n (n=natural number not less than 2) as referencing the exciting frequency f and a preset threshold. That is, the disconnection detection section 413 may detect the wire disconnection based on the exciting frequency f and the magnitude of the resistance value variation component at the high-order frequency of the exciting frequency f. The determination result is stored in the storage section 42 as the disconnection detection data 52.

The alarm section 414 is configured to issue an alarm when the disconnection detection section 413 detects the disconnection. The alarm section 414 alarms by e.g., making a warning sound, indicating a warning sign on the display 43, and issuing a warning signal to an external device to notify that the disconnection is detected to an administrator.

The arithmetic unit 4 is composed of e.g., a personal computer. The present invention is not limited thereto, and the arithmetic unit 4 may comprise a server device. In such a case, the resistance value data 50 measured at the resistance measuring device 3 is sent to the arithmetic unit 4 as the server device via a network. When configuring the arithmetic unit 4 as the server device, the arithmetic unit 4 may be configured to share the result of the disconnection detection (i.e., the disconnection detection data 52), etc., with device users such as robot users, device manufacturers such as robot manufacturers, or the like. In addition, the control section 41 and the storage section 42 may be composed of individual devices. For example, it is possible to configure that the resistance value data 50 stored in the storage section 42 of the server device is downloaded to the control section 41 of the other server device, personal computer, and the like, to detect the disconnection.

Disconnection Detection Method

Figure 6:
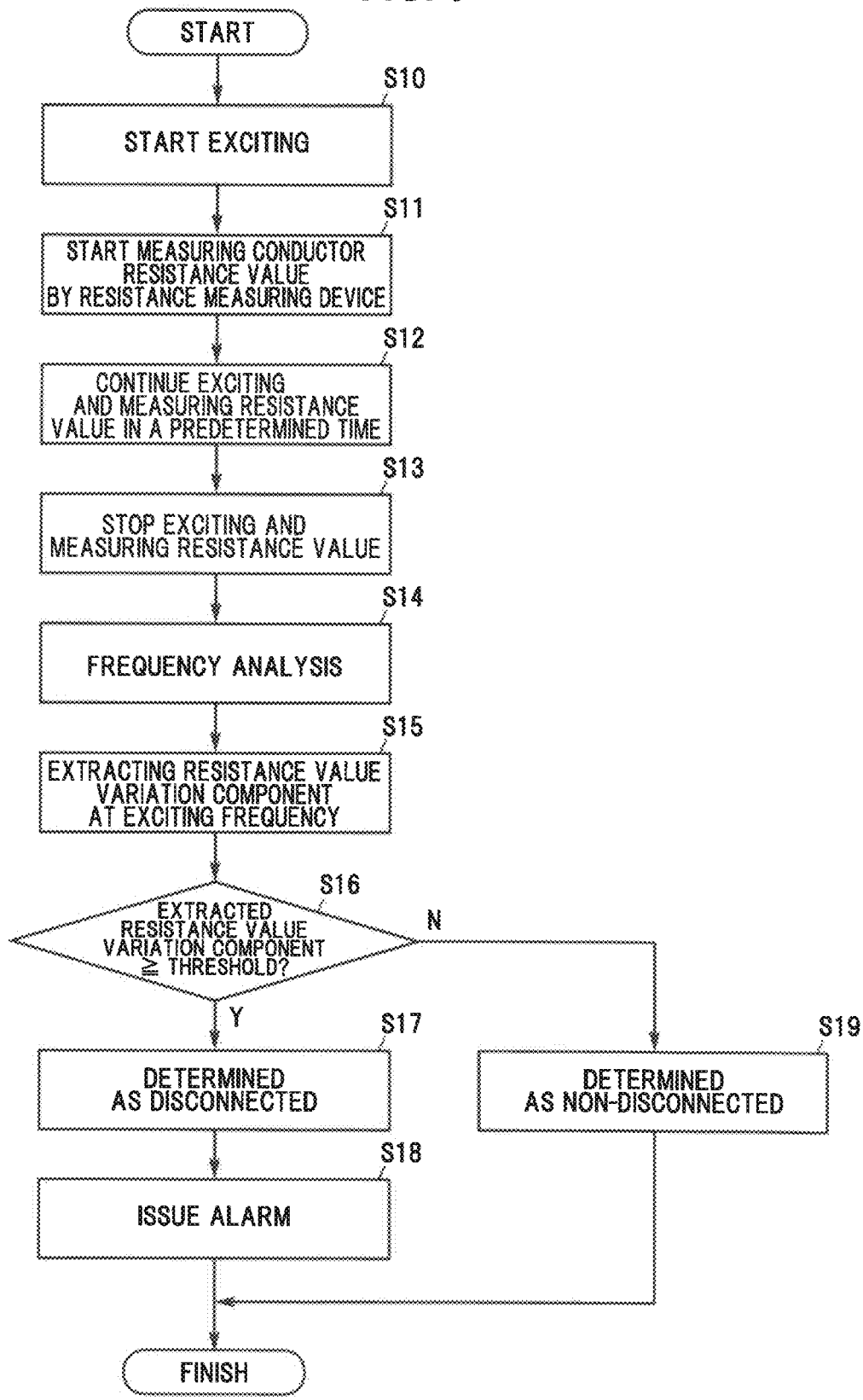
FIG. 6 is a flow chart showing a process of a disconnection detection method.

FIG. 6 is a flow chart showing the process of the disconnection detection method according to the present embodiment. The disconnection detection is preferably performed at a periodic check or the like of the device in which the cable 10 is wired. In addition, the flow shown in FIG. 6 is preferably performed repeatedly while changing the examined portions of the cable 10 (the position to which the vibration head 22 of the exciting mechanism 2 is attached).

Firstly, at Step S10, the exciting mechanism 2 starts the excitation to apply the periodic vibration at the examined portion of the cable 10 as the examination target. Then, at Step S11, the resistance measuring device 3 starts measuring the resistance value of the conductor 11a.

Next, at Step S12, the excitation and the measurement of the resistance value of the conductor 11a are continued for a predetermined period. The predetermined period is a period required for obtaining enough data on the resistance value to detect the disconnection. This predetermined period may be suitably changed depending on the configuration of the resistance measuring device 3, the measuring environment (i.e., the magnitude of the noise component). Hereby, the time-series resistance value of the conductor 11a which changes by the excitation is measured by the resistance measuring device 3.

Next, at Step S13, the excitation and the measurement of the resistance value of the conductor 11a are stopped. The measured resistance value data of the conductor 11a is sent to the arithmetic unit 4 and stored in the storage section 42 as the resistance value data 50.

Next, at Step S14, the frequency analysis section 411 performs the frequency analysis for the resistance value data 50. The frequency analysis result is stored in the storage section 42 as the frequency analysis data 51. Further, the frequency analysis at Step S14 may be performed without stopping the excitation and the measurement of the resistance value. For example, while continuing the excitation and the measurement of the resistance value of the conductor 11a, the frequency analysis section 411 performs the frequency analysis at a stage after an elapse of a predetermined period. Here, since the presence or absence of the disconnection in the conductor 11a can be timely grasped, it is possible to reduce the examination time.

Next, at Step S15, the extracting section 412 extracts the resistance value variation component at the exciting frequency f from the frequency analysis data 51. At this time, the resistance value variation component at a predetermined high-order frequency included in a preset frequency range may be extracted.

Next, at Step S16, the disconnection detection section 413 determines whether the magnitude of the resistance value variation component extracted by the extracting section 412 is not less than the preset threshold or less than the preset threshold. When determined as YES at Step S16, the disconnection detection section 413 determines that the conductor 11a has a disconnection at the examined portion at Step S17, and the alarm section 414 issues an alarm at Step S18. Then, processing is finished. When determined as NO at Step S16, the disconnection detection section 413 determines that there is no disconnection in the conductor 11a at the examined portion and then the processing is finished.

Effects of the Present Embodiment

As explained above, the disconnection detection method according to the present embodiment performs the excitation to apply the periodic vibration at an arbitrary examined portion in the longitudinal direction of the cable 10, measures the time-series resistance value of the conductor 11a by the excitation, performs the frequency analysis for the measured time-series resistance value of the conductor 11a, extracts the resistance value variation component at the exciting frequency corresponding to the operation period of the excitation from the analysis result of the frequency analysis, and detects the wire disconnection at the examined portion based on the magnitude of the extracted resistance value variation component.

According to this configuration, it is possible to suppress the influence of the noise and detect only the resistance value variation component due to the wire disconnection with high sensitivity, to detect the wire disconnection in the conductor 11a of the cable 10 with high accuracy. That is, according to the present embodiment, it is possible to detect the wire disconnection in the conductor 11a of the cable 10, including the early-stage disconnection that is hard to detect by an ordinary detection method using the resistance value increasing rate. Therefore, it is possible to detect the disconnection with high sensitivity. As a result, it is possible to take measures in each device wired with the cable 10 before the occurrence of a fatal obstruction (e.g., disconnections of almost all wires) and thus it is possible to improve the reliability of the device.

Further, in the conventional ordinary detection method using the resistance value increasing rate, the resistance value of the conductor 11a before disconnection, i.e., an initial resistance value is needed. However, in the present embodiment, since the occurrence of disconnection is detected by using the fluctuation amount (i.e., the relative amount) of the resistance value in the excitation rather than the absolute value of the resistance value, the initial resistance value is no longer required. Thus, according to the present embodiment, it is possible to detect the occurrence of the wire disconnection in the conductor 11a with high sensitivity even when the initial resistance value of the conductor 11a is not known.

Further, although the resistance value in the conductor 11a and a contact resistance between the conductor 11a and the resistance measuring device 3 largely vary depending on the temperature, the resistance value variation due to temperature is independent of the operation period in the excitation. Thus, according to the present embodiment, it is possible to detect the disconnection in the conductor 11a without the influence of temperature change.

Furthermore, the portable exciting mechanism 2 allows the examination for the presence or absence of the disconnection without removing the already wired or laid cable 10 from the device or the like. Thus, it is possible to largely reduce the examination time. Still further, in the present embodiment, it is possible to detect the disconnection by applying the vibration with contacting the vibration head 22 to the cable 10 without bending or twisting the cable 10. Thus, it is possible to easily detect the disconnection with high versatility. Further, it is possible to detect the position where the disconnection occurs in the longitudinal direction of the cable 10 by moving the examined portion along the longitudinal direction of the cable 10 and repeating the disconnection detection. Furthermore, in the present embodiment, it is possible to estimate the disconnection progress in the longitudinal direction of the cable 10 by comparing the magnitudes of the resistance value variation component extracted at respective examined portions in the longitudinal direction of the cable 10 with each other.

Variation 1

In the above embodiment, the method for detecting the occurrence of disconnection in the conductor 11a is explained. In the meantime, it is possible to estimate the disconnection progress (disconnection progress estimation) after the occurrence of disconnection.

As a result of zealous studies, the present Inventors found that a difference between the maximum resistance value and the minimum resistance value of the conductor 11a increases as increasing the number of disconnected wires and progressing the disconnection. Thus, it is possible to estimate the disconnection progress of the conductor 11a based on the difference between the maximum resistance value and the minimum resistance value. For example, it is possible to estimate the disconnection progress of the conductor 11a by setting gradually plural thresholds and comparing each threshold and the difference between the maximum resistance value and the minimum resistance value. In addition, the disconnection progress of the conductor 11a is a rate of the number of disconnected wires with respect to all wires constituting the conductor 11a. Further, the estimated disconnection progress is stored as disconnection progress data in the storage section 42 as shown in FIG. 1.

In addition, by setting that the cable 10 reaches a lifetime (=cable lifetime) as the disconnection progress reaches a predetermined rate (e.g., 80% or more), it is possible to predict the lifetime of the cable 10 by predicting whether the estimated disconnection progress reaches to the cable lifetime or not. Based on the lifetime prediction result of the cable 10, it is possible to determine whether the cable 10 should be exchanged or subjected to a predictive maintenance for the cable 10 or not. Further, the lifetime prediction result of the cable 10 based on the disconnection progress is stored as a cable lifetime prediction data in the storage section 42 as shown in FIG. 1. In addition, the arithmetic unit 4 may be configured to indicate the obtained disconnection progress data or the cable lifetime prediction data on the display 43.

Variation 2

Figure 7:
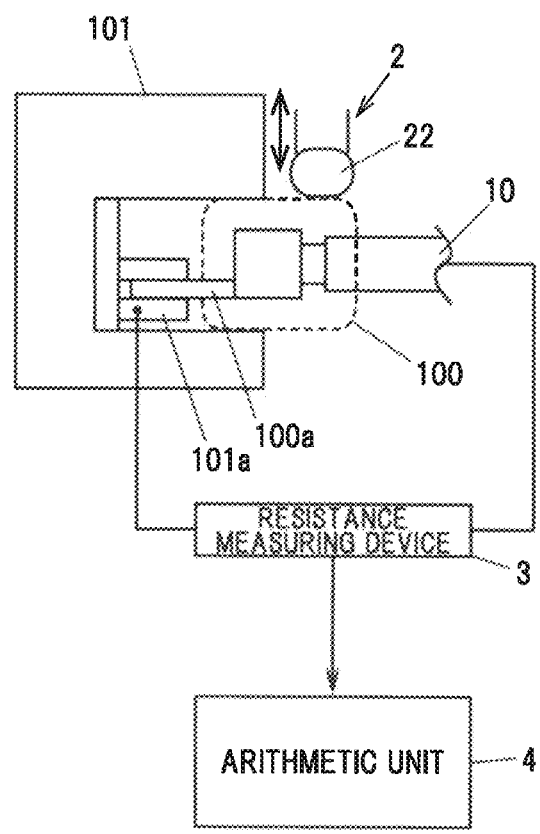
FIG. 7 is a schematic configuration diagram showing a disconnection detection device according to one modified example of the present invention.

In addition, the present invention can be applied to an examination for the integrity of connectors or the integrity of electric conductivity (presence or absence of a contact failure). As shown in FIG. 7, the case where a connector 100 provided at an end portion of the cable 10 is connected to a device-side connector 101 provided to an arbitrary device will be explained. In the example shown in FIG. 7, an electrode 100a (connector-side electrode) provided at the connector 100 is electrically connected to an electrode 101a (device-side electrode) provided at the device-side connector 101 by connecting the connectors 100, 101 to each other.

For example, when an oxide film or corrosion is generated at surfaces of the electrodes 100a, 101a due to stuck water, or a metal plating provided on the surfaces of the electrodes 100a, 101a is peeled off, the contact resistance increases at the target part. In addition, when applying a periodic vibration to the connector 100 and applying a periodic vibration to a contact part between the electrode 100a and the electrode 101a, the contact resistance between the electrode 100a and the electrode 101a varies periodically (the same period as the vibration period). Therefore, it is possible to detect the presence of a part with a high contact resistance (the generation of the oxide film or corrosion or the peel-off of the metal plating) based on the magnitude of variation component at the exciting frequency in the contact resistance.

That is, the resistance measuring device 3 measures the time-series resistance value by excitation at an area including the contact part between the electrode 100a and the electrode 101a (the electrical contact of the examination target), so that it is possible to examine the integrity of the connectors 100, 101, or the integrity of electric contact between the electrode 100a and the electrode 101a. In more detail, by performing the frequency analysis of the time-series resistance value measured in the resistance measuring device 3 and extracting the resistance value variation component at the exciting frequency corresponding to the operation period of the excitation based on the analysis result of the frequency analysis, it is possible to detect the presence of a part with a high contact resistance such as oxide film at the electrical contact based on the magnitude of the extracted resistance value variation component and examine the integrity of the connectors 100, 101, or the integrity for electric contact between the electrode 100a and the electrode 101a. In addition, the arithmetic unit 4 as shown in FIG. 7 is the same as the arithmetic unit 4 shown in FIG. 1.

In the example shown in FIG. 7, although the vibration is applied to the connector 100 by attaching the vibration head 22 to the connector 100, the present invention is not limited thereto. The vibration may be applied to any position where the electric contact as the examination target is excited. For example, the vibration may be applied to the cable 10 or the device-side connector 101. In addition, although the example shown in FIG. 7 illustrates the connectors 100, 101 for connecting between the cable 10 and the device, the present invention is not limited thereto. For example, it is possible to examine a connector for connecting between cables similarly.

Summary of Embodiments

Next, the technical concept grasped from the above-explained embodiment is described with reference to the signs or the like in the embodiment. However, each sign or the like in the following description is not limited to a member or the like specifically showing the elements in the following claims in the embodiment.

According to the first feature, a method for detecting a disconnection of a conductor 11a of a cable 10 includes performing an excitation to apply a periodic vibration at an arbitrary examined portion in a longitudinal direction of the cable 10; measuring a time-series resistance value of the conductor 11a by the excitation; performing a frequency analysis of the measured time-series resistance value of the conductor 11a; extracting a resistance value variation component at an exciting frequency corresponding to an operation period of the excitation from a result of the frequency analysis; and detecting the disconnection in the conductor 11a at the examined portion based on a magnitude of the extracted resistance value variation component.

According to the second feature, in the method according to the first feature, the excitation applies a vibration to cause a displacement to the cable 10 in the longitudinal direction of the cable 10 while applying a constant tension to the cable 10.

According to the third feature, the method according to the first or second feature, further includes extracting a resistance value variation component at a high-order frequency as referencing the exciting frequency from the result of the frequency analysis, and detecting the disconnection in the conductor 11a based on magnitudes of the resistance value variation component at the exciting frequency and the high-order frequency.

According to the fourth feature, a disconnection detection device 1 for detecting a disconnection in a conductor 11a of a cable 10 includes an exciting mechanism 2 to perform an excitation to apply a periodic vibration at an arbitrary examined portion in a longitudinal direction of the cable 10; a resistance measuring device 3 to measure a time-series resistance value of the conductor 11a by the excitation; a frequency analysis section 411 to perform a frequency analysis for the measured time-series resistance value of the conductor 11a; an extracting section 412 to extract a resistance value variation component at an exciting frequency corresponding to an operation period of the excitation from a result of the frequency analysis; and a disconnection detection section 413 to detect the disconnection in the conductor 11a at the examined portion based on a magnitude of the extracted resistance value variation component.

Although the embodiments of the invention have been described, the invention is not to be limited to the embodiments. Please note that all combinations of the features described in the embodiments are not necessary to solve the problem of the invention. In addition, the various kinds of modifications can be implemented without departing from the gist of the invention.

For example, in the above embodiment, the case where the conductor 11a as a disconnection detection target is a twisted wire conductor is explained. The present invention is not limited thereto. The conductor as a disconnection detection target should be a conductor composed of one or more wires. The conductor may be an outer conductor (shielding layer) provided to collectively cover around the cable core. More specifically, the conductor as a disconnection detection target may be a braided shield (braided conductor) braiding the plurality of wires or a laterally wound shield (laterally wound conductor) spirally winding the plurality of wires.

The invention claimed is:
1. A method for detecting disconnection for a conductor of a cable, comprising:
performing an excitation to apply a periodic vibration that causes displacement of an arbitrary examined portion in a direction perpendicular to a longitudinal direction of the cable, by holding the cable at two points along the longitudinal direction of the cable using a probe having a vibration head that vibrates, pressing the vibration head against the examined portion located between the two points along the longitudinal direction of the cable, and vibrating the vibration head in the direction perpendicular to the longitudinal direction of the cable, wherein the vibration applied to the cable has no component along the longitudinal direction of the cable;
measuring a time-series resistance value of the conductor caused by the excitation;
performing a frequency analysis of the measured time-series resistance value of the conductor;
extracting a resistance value variation component at an excitation frequency corresponding to an operation period of the excitation from a result of the frequency analysis; and
detecting disconnection in the conductor at the examined portion based on a magnitude of the extracted resistance value variation component.

2. The method according to claim 1, wherein the excitation applies a vibration to cause a displacement to the cable in the longitudinal direction of the cable while applying a constant tension to the cable.

3. The method according to claim 1, further comprising:
extracting a resistance value variation component at a high-order frequency as referencing the exciting frequency from a result of the frequency analysis; and
detecting the disconnection in the conductor based on a magnitude of the resistance value variation component at the exciting frequency and the high-order frequency.

4. A disconnection detection device for detecting a disconnection in a conductor of a cable, comprising:
an exciting mechanism to perform an excitation to apply a periodic vibration that causes displacement of an arbitrary examined portion in a direction perpendicular to a longitudinal direction of the cable, by holding the cable at two points along the longitudinal direction of the cable using a probe having a vibration head that vibrates, pressing the vibration head against the examined portion located between the two points along the longitudinal direction of the cable, and vibrating the vibration head in the direction perpendicular to the longitudinal direction of the cable, wherein the vibration applied to the cable has no component along the longitudinal direction of the cable;
a resistance measuring device to measure a time-series resistance value of the conductor by the excitation;
a frequency analysis section to perform a frequency analysis for the measured time-series resistance value of the conductor;
an extracting section to extract a resistance value variation component at an exciting frequency corresponding to an operation period of the excitation from a result of the frequency analysis; and
a disconnection detection section to detect the disconnection in the conductor at the examined portion based on a magnitude of the extracted resistance value variation component.

* * * * *